United States Patent
Nolan et al.

(10) Patent No.: US 9,453,475 B2
(45) Date of Patent: *Sep. 27, 2016

(54) METHOD AND SYSTEM FOR ESTIMATING FUEL COMPOSITION

(71) Applicant: Ford Global Technologies, LLC, Dearborn, MI (US)

(72) Inventors: Adam Nolan, Glenroy (AU); Jamie Terence Slaymaker, Lara (AU); Andrew Paul Chee Aun Wong, Kensington (AU); Phuoc Buiquang, Maribyrnong (AU)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

This patent is subject to a terminal disclaimer.

(21) Appl. No.: 14/481,744

(22) Filed: Sep. 9, 2014

(65) Prior Publication Data

US 2014/0379240 A1 Dec. 25, 2014

Related U.S. Application Data

(63) Continuation of application No. 13/414,620, filed on Mar. 7, 2012, now Pat. No. 8,831,857.

(51) Int. Cl.
*F02M 21/02* (2006.01)
*F02D 41/38* (2006.01)
(Continued)

(52) U.S. Cl.
CPC ......... *F02D 41/3845* (2013.01); *F02D 19/022* (2013.01); *F02D 19/024* (2013.01);
(Continued)

(58) Field of Classification Search
CPC .. F02D 19/022; F02D 19/027; F02D 19/028; F02D 19/029; F02D 19/0626; F02D 19/0628; F02D 19/0631; F02D 19/0634; F02D 19/0636; F02D 19/0639; F02D 19/0647; F02D 41/0027; F02D 41/062

USPC ............... 123/1 A, 456, 457, 466, 491, 435, 123/198 DB, 481, 525; 701/103–105, 112, 701/113

See application file for complete search history.

(56) References Cited

U.S. PATENT DOCUMENTS

| 5,033,444 A | 7/1991 | Kaufman et al. |
| 5,697,346 A | 12/1997 | Beck |

(Continued)

FOREIGN PATENT DOCUMENTS

| AU | 2010200354 A1 | 8/2011 |
| EP | 0828070 A2 | 3/1998 |

(Continued)

OTHER PUBLICATIONS

Anonymous, "Dispensing Gas Station Fuel Pump Flow Rate Synchronization With Vehicle to Minimize Shutoffs," IPCOM No. 000234534, Published Jan. 16, 2014, 2 pages.

(Continued)

*Primary Examiner* — Hai Huynh
(74) *Attorney, Agent, or Firm* — Julia Voutyras; Alleman Hall McCoy Russell & Tuttle LLP

(57) ABSTRACT

Methods and systems are provided for operating a fuel system configured to deliver a gaseous fuel to an engine. Following tank refilling, the fuel composition is selectively updated based on fuel tank pressure, temperature, and air content data. When the engine is subsequently restarted, the fuel rail is primed for a duration based on the updated composition.

20 Claims, 7 Drawing Sheets

(51) Int. Cl.
  F02D 41/00 (2006.01)
  F02D 19/02 (2006.01)
  F02D 19/06 (2006.01)
  F02N 19/00 (2010.01)
  F02D 41/06 (2006.01)

(52) U.S. Cl.
  CPC ......... *F02D19/027* (2013.01); *F02D 19/0647* (2013.01); *F02D 41/0025* (2013.01); *F02M 21/0221* (2013.01); *F02D 41/0027* (2013.01); *F02D 41/062* (2013.01); *F02D 2200/0612* (2013.01); *F02N 2019/002* (2013.01); *F02N 2200/0815* (2013.01); *Y02T 10/32* (2013.01); *Y02T 10/36* (2013.01)

(56) References Cited

U.S. PATENT DOCUMENTS

| | | | |
|---|---|---|---|
| 5,887,574 | A | 3/1999 | Smith |
| 5,902,346 | A | 5/1999 | Cullen et al. |
| 6,109,244 | A | 8/2000 | Yamamoto et al. |
| 6,155,235 | A | 12/2000 | Kilgore |
| 6,766,269 | B2 | 7/2004 | Lee |
| 6,830,026 | B2 | 12/2004 | Agricola et al. |
| 7,318,414 | B2 | 1/2008 | Hou |
| 8,443,785 | B2 * | 5/2013 | Carter .................. F02D 19/022 123/457 |
| 8,831,857 | B2 * | 9/2014 | Nolan ................ F02D 41/3845 123/456 |
| 2003/0216883 | A1 | 11/2003 | Lee |
| 2005/0034710 | A1 | 2/2005 | Crary et al. |
| 2005/0049777 | A1 | 3/2005 | Fritsch et al. |
| 2006/0231078 | A1 | 10/2006 | Barylski et al. |
| 2009/0120413 | A1 | 5/2009 | Ramamurthy et al. |
| 2009/0221868 | A1 | 9/2009 | Evans |
| 2011/0186012 | A1 | 8/2011 | Wong et al. |
| 2012/0330532 | A1 | 12/2012 | Matsuura et al. |
| 2013/0238226 | A1 | 9/2013 | Slaymaker et al. |

FOREIGN PATENT DOCUMENTS

| | | |
|---|---|---|
| GB | 2116254 A | 9/1983 |
| JP | 59018261 A | 1/1984 |
| WO | 2005021952 A1 | 3/2005 |
| WO | 2008007128 A1 | 1/2008 |

OTHER PUBLICATIONS

Anonymous, "Fuel Level Indication Correction as a Function of Fuel Tank Pressure, Temperature and Time," IPCOM No. 000234612, Published Jan. 22, 2014, 5 pages.

Anonymous, "Method to Control Fuel Vapor Flow Into Canister During Refueling for HEV'S," IPCOM No. 000234787, Published Feb. 5, 2014, 2 pages.

Anonymous, "A Nircos System for Non-ORVR Compliant Vehicles," IPCOM No. 000236469, Published Apr. 29, 2014, 2 pages.

Anonymous, "Detection of Plumbing Disconnect in Ejector Portion of Fuel Vapor Purge System," IPCOM No. 000241283, Published Apr. 13, 2015, 2 pages.

Anonymous, "A Remote Fuel Tank Depressurization Method for PHEV Vehicles," IPCOM No. 000241445, Published Apr. 28, 2015, 2 pages.

* cited by examiner

METHOD AND SYSTEM FOR ESTIMATING FUEL COMPOSITION

CROSS REFERENCE TO RELATED APPLICATIONS

The present application is a continuation of U.S. patent application Ser. No. 13/414,620, "METHOD AND SYSTEM FOR ESTIMATING FUEL COMPOSITION," filed on Mar. 7, 2012, now U.S. Pat. No. 8,831,857, the entire contents of which are hereby incorporated by reference for all purposes.

FIELD

The present application relates to accurately estimating a fuel composition in a vehicle using liquefied petroleum gas, and adjusting engine operations in accordance.

BACKGROUND/SUMMARY

Alternate fuels have been developed to mitigate the rising prices of conventional fuels and for reducing exhaust emissions. For example, some gaseous fuels have been recognized as attractive alternative fuels. For automotive applications, natural gas or petroleum gas may be compressed and stored as a liquid (liquefied petroleum gas, or LPG) in cylinders at saturation pressure. LPG predominantly consists of butane and propane, although the exact ratio may vary. As such, the composition of LPG affects the fuel properties of LPG, such as fuel density, saturation pressure, octane rating, etc. Since the fuel properties in turn affect engine operations (e.g., fuel injection amount and timing, etc.), accurate fuel composition estimation is required when using LPG as an automotive fuel.

One example approach for estimating the composition of an LPG fuel is shown by Lee in 2003/0216883. Therein, the LPG fuel composition is calculated from a fuel tank pressure and temperature estimated inside the fuel tank. In particular, the estimated fuel tank pressure and temperature are used to infer saturation vapor pressure data, which in turn is used to estimate the fuel composition.

However, the inventors herein have identified potential issues with such an approach. As one example, fuel tank refill events may affect a fuel composition estimate. The refill induced change in composition may also affect the duration of fuel rail priming required at a subsequent engine restart. As another example, the amount of residual air in the fuel tank may affect the composition estimation. For example, if the amount of the air in the fuel tank is high (e.g., due to the fuel tank not being sufficiently purged during a service event), the partial pressure of the tank air may exceed the saturation pressure of the LPG fuel. The elevated fuel tank pressure may lead to an inaccurate LPG composition estimate. As such, errors in estimating the LPG composition may lead to inaccurate fuel injection as well as insufficient priming, causing degraded engine performance and even engine stalls.

Thus, in one example, some of the above issues may be addressed by a method for an engine operating on a gaseous fuel comprising, inferring a refill event based on a rate of change in fuel tank pressure, and in response to the refill event, selectively updating an estimated fuel composition and priming a fuel rail during a subsequent engine restart. A priming duration may be based on the updated composition. In this way, the accuracy and reliability of a fuel composition update may be improved.

In one example, a refill event for a fuel tank storing a gaseous fuel, such as LPG fuel, may be confirmed based on a rate of change in the fuel tank pressure being higher than a threshold rate. In alternate embodiments, the fuel tank refill event may be inferred based on an increase in the fuel level. Since fuel tank refilling affects the composition of fuel present in the tank, following the refill event, the fuel composition may be updated. By updating the fuel composition while the engine is shutdown, a conservative and most recent fuel composition estimate may be available when the engine is subsequently restarted. The fuel composition may be updated based on fuel tank pressure, temperature and residual air content data. Specifically, the fuel composition is updated only if fuel tank conditions are within defined windows wherein the fuel tank data are reliable. The updated composition may then be used during a subsequent engine restart to determine a priming duration. Specifically, before the engine is cranked and started, the fuel line and rail may be vapor purged by operating the fuel pump for the determined duration to prime the fuel system. As such, this improves engine startability. In addition, fuel injection timing and amounts at the engine start may be adjusted based on the updated composition. If the fuel composition cannot be updated due to fuel tank conditions not permitting the update, a most recent, un-updated, composition estimate may be retained and used to adjust the priming duration along with a correction factor.

It will be appreciated that the gaseous fuel referred to herein is a fuel that is gaseous at atmosphere conditions but may be in liquid form while at high pressure (specifically, above saturation pressure) in the fuel system.

In this way, a composition update may be enabled only upon ascertaining that the tank data is not erroneous, or subject to corruption. Consequently, a fuel composition may be estimated post an extended engine shutdown condition with higher accuracy and reliability. By using the more accurate fuel composition estimate to adjust priming operations before an engine start, and injector operations following the engine start, engine performance may be improved. In addition, engine stalls due to insufficient fuel rail priming may be reduced.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
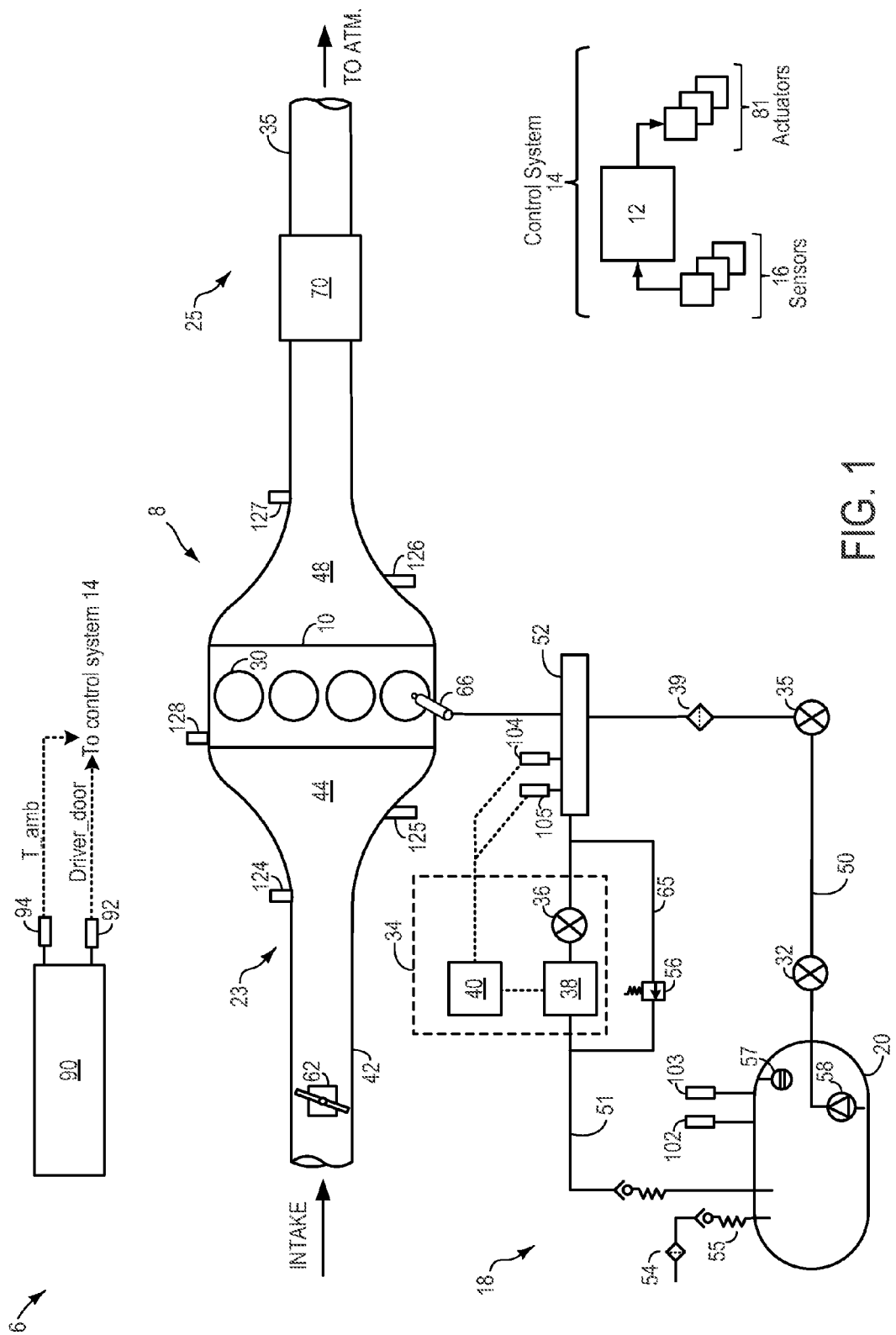
FIG. 1 shows a schematic depiction of an engine system configured to operate on a gaseous fuel.
Figure 2A:
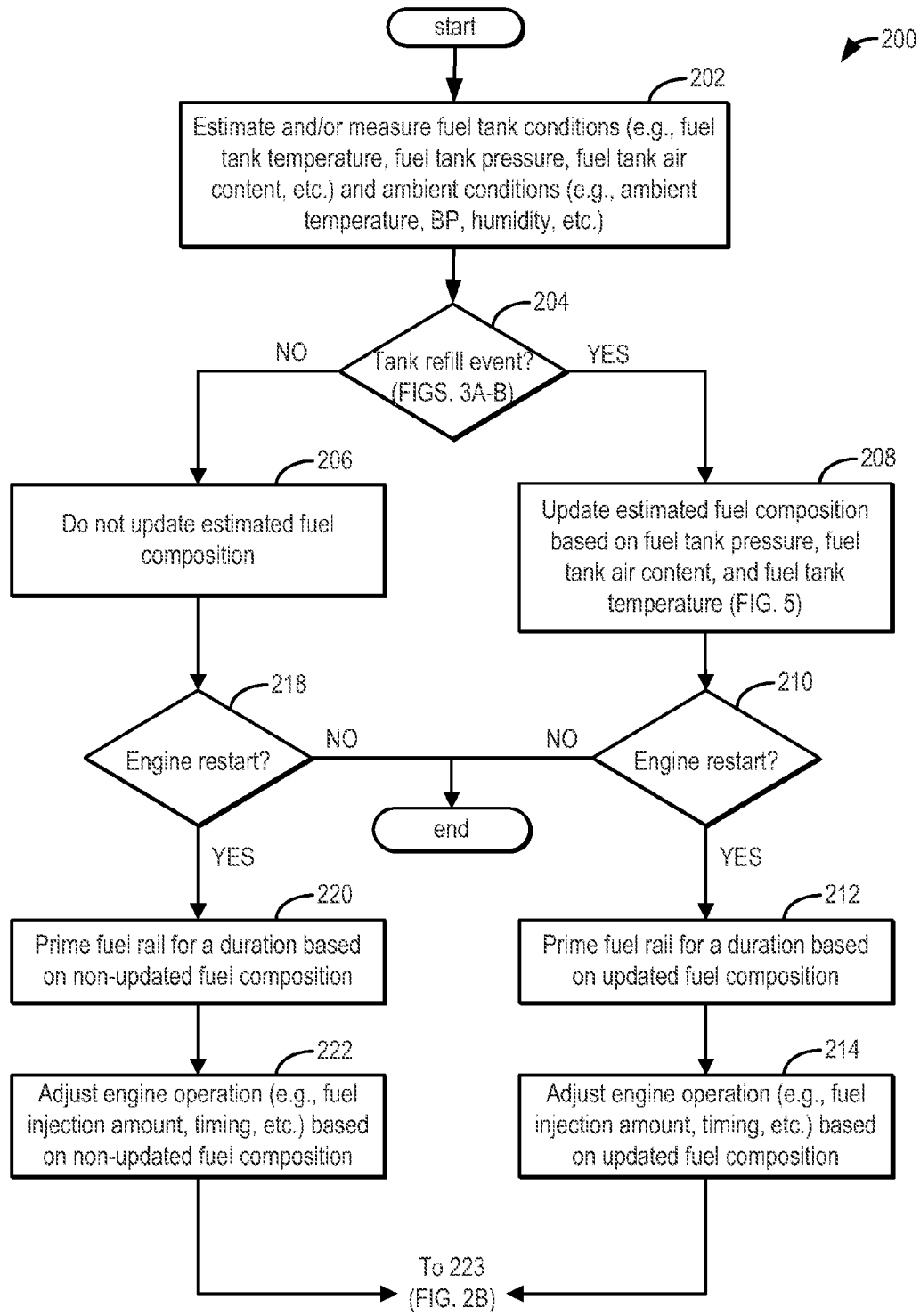
FIGS. 2A-B show an example high level flowchart for updating a fuel composition estimate in response to fuel tank refilling, and adjusting engine operations accordingly.
Figure 2B:
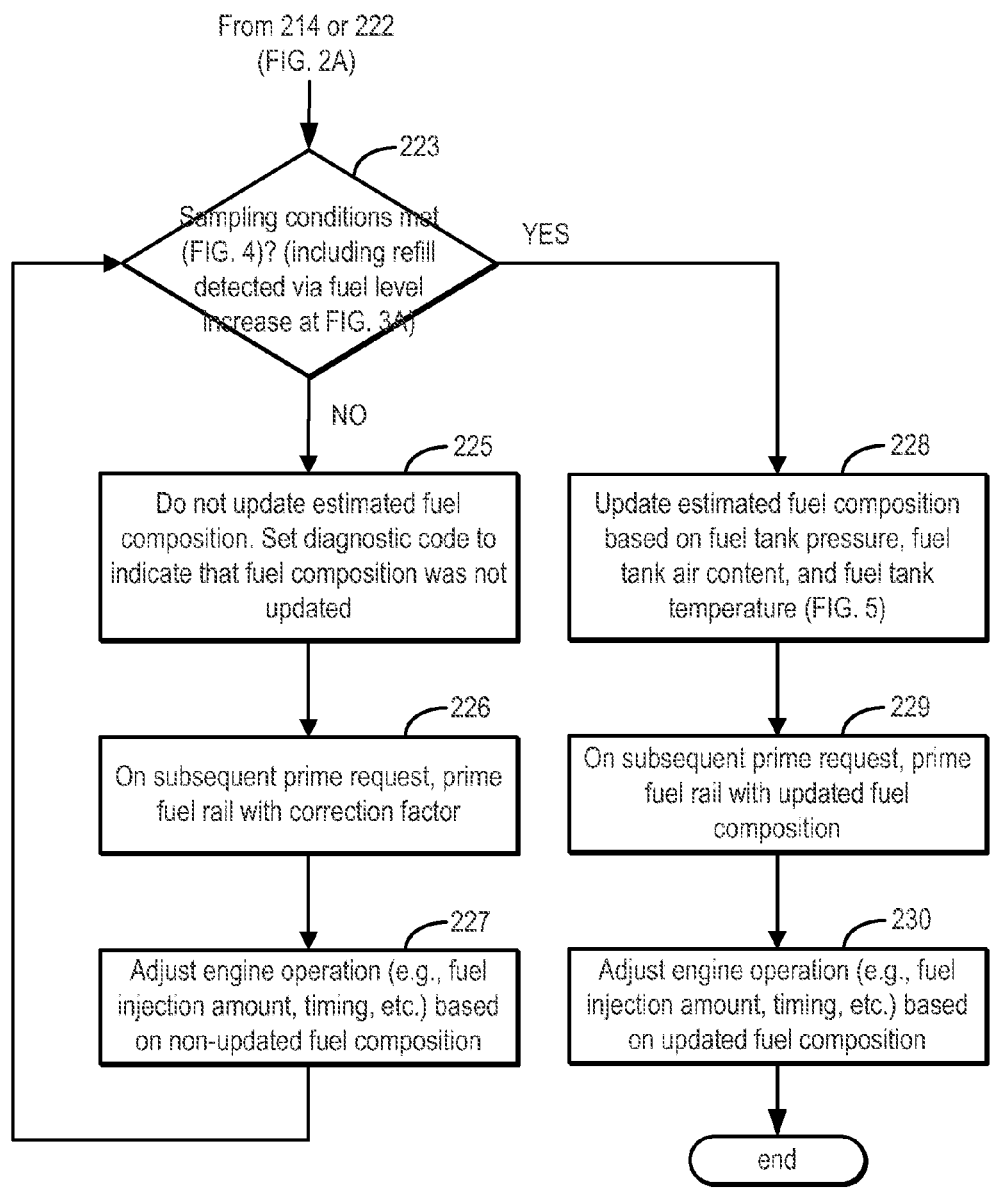
Figure 3A:
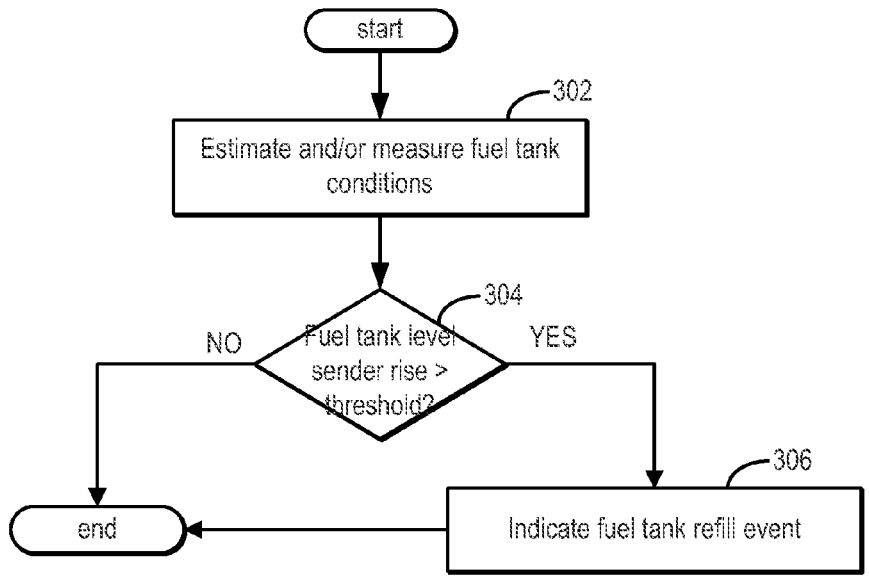
FIG. 3A shows an example flowchart for confirming a fuel tank refill event based on a change in fuel tank level.
Figure 3B:
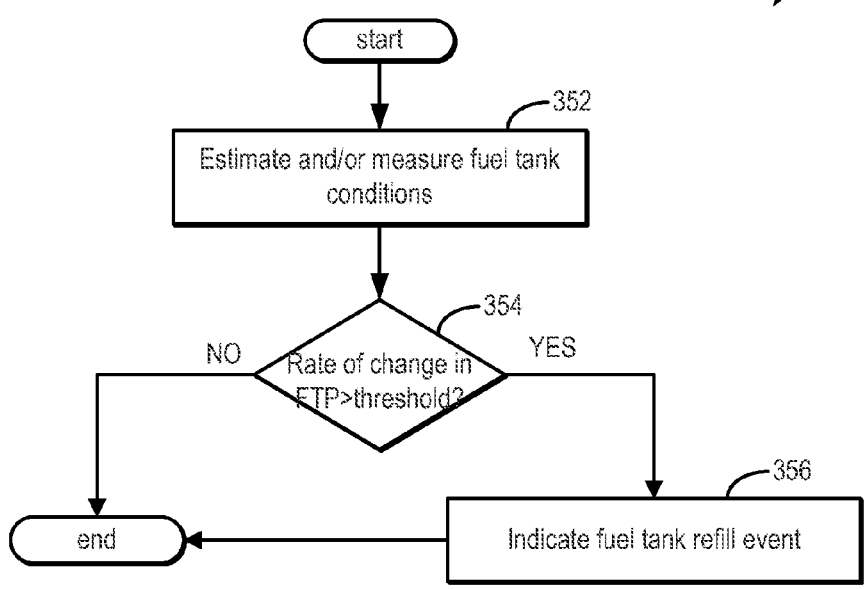
FIG. 3B shows an example flowchart for confirming a fuel tank refill event based on a rate of change in fuel tank pressure.
Figure 4:
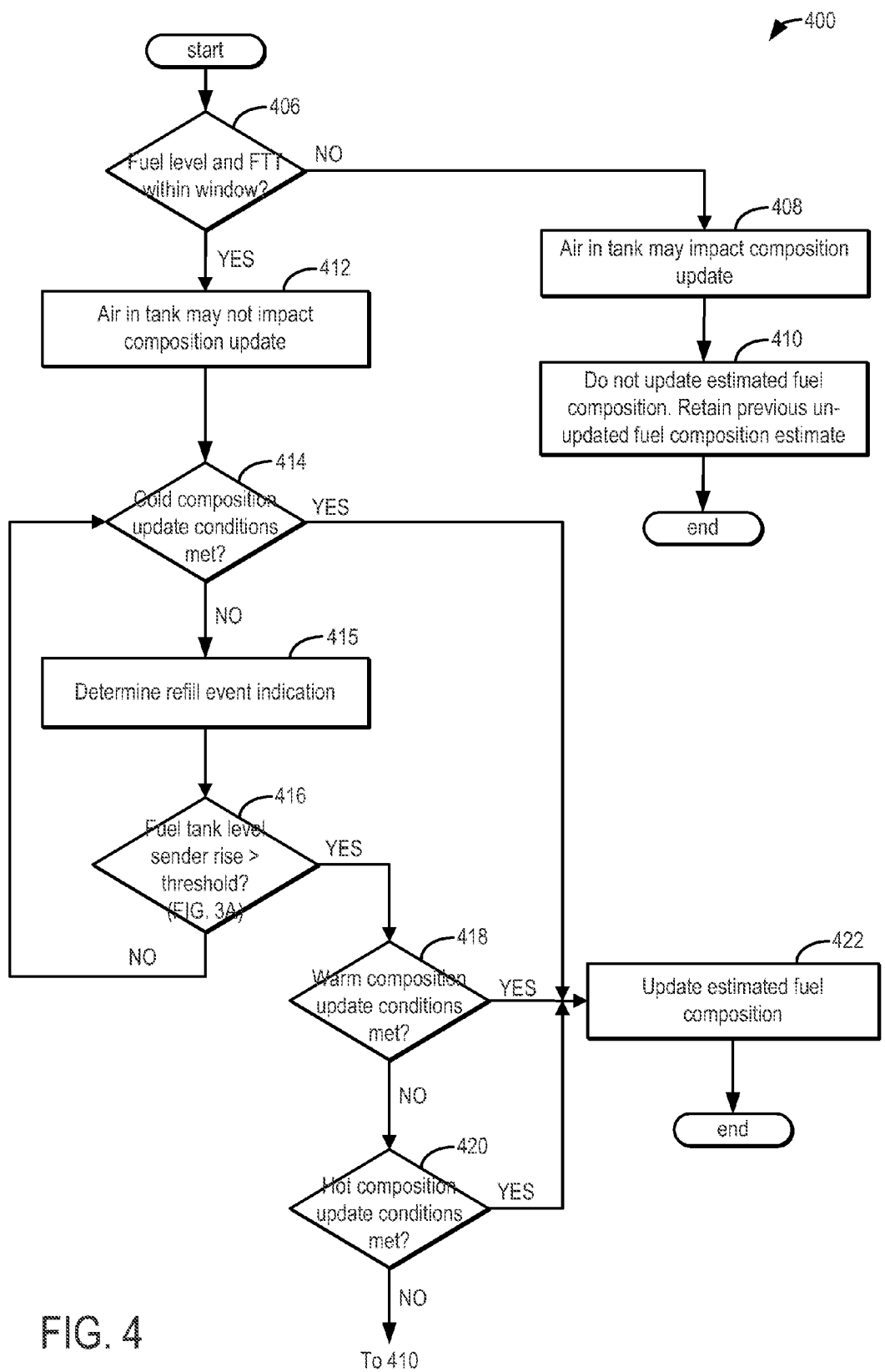
FIGS. 4-5 show example flowcharts for updating a fuel composition based on fuel tank conditions.
Figure 5:
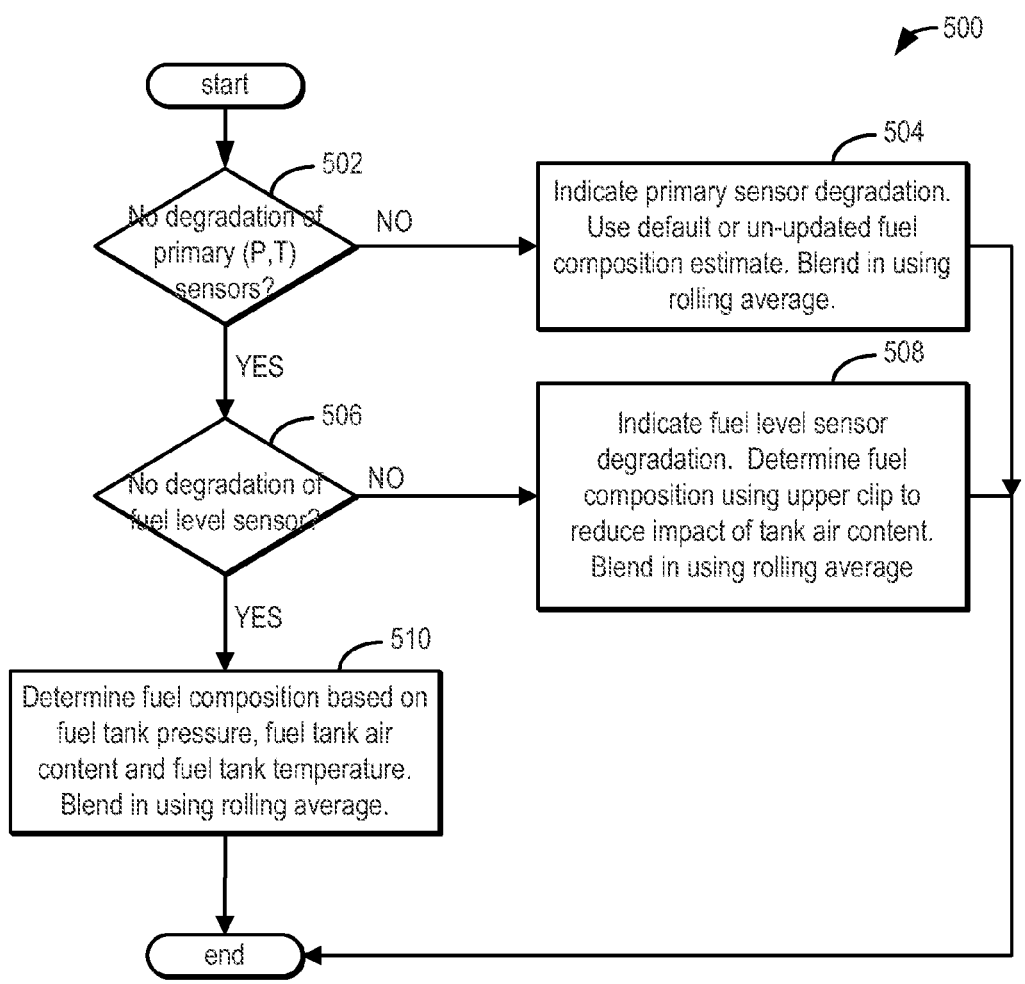
Figure 6:
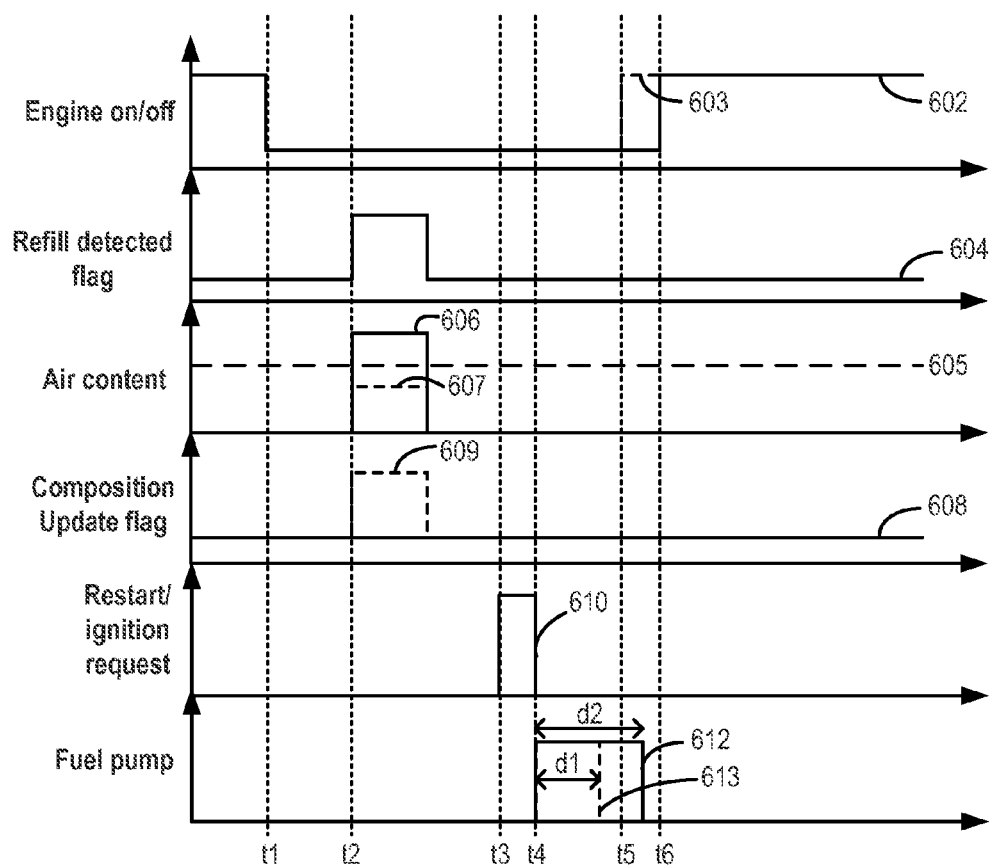
FIG. 6 shows example adjustments to a priming operation based on a fuel composition update.

Methods and systems are provided for operating a mono- or multi-fuel engine system using a gaseous fuel, such as the system of FIG. 1. A controller may be configured to update a composition estimate of the gaseous fuel following tank refilling and/or during conditions when a reliable fuel composition estimation can be performed. The controller may then adjust one or more engine operations, such as fuel rail priming and fuel injection settings, based on the updated composition estimate. For example, the controller may be configured to perform a routine, such as the routine of FIGS. 2A-B, to confirm a fuel tank refill event and then update the fuel composition if selected fuel tank sampling conditions are met. Alternatively, the fuel composition may be updated before an engine restart if appropriate sampling conditions are met. A fuel tank refill event may be confirmed based on a rate of change in a fuel tank pressure and/or a change in fuel level (FIGS. 3A-B). The sampling conditions may be confirmed to ensure that a fuel tank air content will not impact a fuel composition estimate (FIG. 4). If the sampling conditions are met, the fuel composition may be updated based on one or more of a fuel tank pressure, a fuel tank air content, a fuel tank temperature, and an ambient temperature (FIG. 5). However, if sampling conditions are not met, an un-updated fuel composition estimate may be used (e.g., with a correction factor). The fuel composition may be updated during an engine shutdown condition when refueled so that engine operations during the subsequent engine restart can be adjusted based on the updated composition. Example priming operations are shown at FIG. 6. In this way, by accurately estimating the composition of the gaseous fuel and adjusting engine operations based on a reliable estimate, engine performance and fuel economy may be improved.

FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere upon passage through an emission control device 70. It will be appreciated that other components may be included in the engine such as a variety of valves and sensors. Fuel system 18 may include one or more fuel tanks. In the depicted example, the fuel system is a mono-fuel system including fuel tank 20 configured to store a gaseous fuel and deliver the fuel to engine 10 via fuel supply line 50 and fuel rail 52. As used herein, the gaseous fuel refers to a fuel that is gaseous at atmospheric condition but which may be stored and delivered to the engine in liquid form (at a pressure above saturation pressure, as elaborated below). The fuel system 18 further includes a fuel recovery line 51 between fuel tank 20 and the injectors 66 of fuel rail 52 so that unused fuel can be recovered. The gaseous fuel may be stored in fuel tank 20 at saturation pressure. Further, when fuel system 18 is configured as a liquid phase injection (LPI) system, as depicted in the given example, the gaseous fuel is delivered to the fuel rail at an elevated pressure. In one example, the gaseous fuel may be compressed natural gas fuel (CNG fuel) or liquefied petroleum gas fuel (LPG fuel). Herein, in the liquid phase injection system example, when stored at saturation pressure, and while delivered along the fuel line and fuel rail at high pressure, the fuel may be in liquid form. However, when injected into the engine via the injectors into the combustion chamber at lower pressure (e.g., into a lower pressure fuel preparation are engine), the fuel may transition into a gaseous form (e.g., vaporize). By maintaining the fuel at higher pressure and in liquid form during delivery along the fuel line and into the fuel rail, metering of the gaseous fuel may be facilitated. Various fuel system components, such as various valves, pressure regulators, filters, and sensors, may be coupled along fuel supply and recovery lines 50 and 51, as described below.

While fuel system 18 is depicted herein as a mono-fuel system, in alternate embodiments, fuel system 18 may be a multi-fuel system including one or more additional fuel tanks for delivering other fuels having different chemical and physical properties to the engine along dedicated fuel lines (not shown). For example, the gaseous fuel in fuel tank 20 may be a first fuel (e.g., LPG fuel) and the fuel system may include a second liquid fuel (e.g., gasoline, fuels with a range of alcohol concentrations, various gasoline-ethanol fuel blends such as E10 and E85, and combinations thereof). As used herein, the liquid fuel refers to a fuel that is liquid at atmospheric conditions, and that may be stored in a fuel tank and delivered along a fuel rail as a liquid under atmospheric conditions.

In one example, where the gaseous fuel is an LPG fuel, the composition of the fuel may vary. For example, the composition may vary based on the source of the fuel (e.g., country of origin, country of use, etc.) as well as the specific application of the fuel. For example, in Australia, LPG fuel includes 5 main constituents, namely, propane, propene, n-butane, i-butane and butenes. Differing LPG fuels may have differing ratios of the various constituents. Since the composition of the fuel affects various physical and chemical properties of the fuel (e.g., fuel density, saturation pressure, octane rating, etc.), which in turn affects engine operations (e.g., fuel injection amount and timing, knock suppression, etc.), accurate fuel composition estimation is required when using LPG as an automotive fuel. LPG fuel compositions may be estimated or inferred based on fuel tank pressure and temperature data. As such, the fuel tank data enables estimation of only two components. Thus, for purposes of composition estimation, the propane and propene constituents of the LPG fuel are grouped together (collectively called "propane") while the n-butane and i-butane constituents of the LPG fuel are grouped together (collectively called "butane"). The percentage of butenes in LPG fuels may be relatively low, and may be considered insignificant for purposes of composition estimation. Example LPG compositions in Australia may include a range of propane to butane ratios varying from 40/60 to 100/0 (propane/butane). As elaborated herein with reference to FIGS. 2A-B through 5, following a fuel tank refill event and/or when selected sampling conditions are met, the estimated fuel composition may be updated. Engine operations may then be adjusted based on the updated fuel composition estimate. If the operating conditions do not permit an accurate fuel composition update (e.g., the selected sampling conditions are not met), engine operations may be adjusted based on an un-updated (or most recent) fuel composition estimate. Also, the engine operations may be adjusted (e.g., with a correction factor) to compensate for the lack of a most recent fuel composition estimate.

Fuel may be delivered from fuel tank 20 to the injectors of engine 10, such as example injector 66, via fuel rail 52. While only a single injector 66 is depicted, additional injectors are provided for each cylinder 30. In one example, where fuel system 18 includes a direct injection system, injector 66 may be configured as a direct fuel injector. In an alternate embodiment, fuel system 18 may include a port injection system wherein injector 66 may be configured as a port fuel injector. In still other embodiments, each cylinder may include one or more injectors including a direct injector and a port injector.

Fuel tank 20 may be refilled with gaseous fuel via fueling port 54 which may include a filter for filtering the fuel (e.g., a compressed, liquid version of the gaseous fuel) prior to storage. The fueling port may also be coupled to a check valve 55 to ensure correct flow of fuel from fueling port 54 into fuel tank 20. A fuel level sensor 57 (herein also referred to as a fuel level sender) coupled to fuel tank 20 may provide an indication of a fuel liquid level in the tank to control system 14. In one example, fuel level sensor 57 may comprise a float connected to a variable resistor. Alternatively, other types of fuel level sensors may be used. A fuel tank pressure sensor or pressure transducer 102 may also be coupled to fuel tank 20 to provide an estimate of a fuel tank pressure to control system 14. Likewise, a fuel tank temperature sensor 103 may be coupled to fuel tank 20 to provide an estimate of a fuel tank temperature to control system 14. While fuel tank pressure sensor 102 and temperature sensor 103 are shown coupled to fuel tank 20, they may alternatively be coupled to fuel supply line 50. Optionally, additional pressure and temperature sensors may be coupled to fuel recovery line 51.

Fuel tank 20 may include a fuel pump 58 (or fuel pump module) for pumping fuel at higher pressure into fuel line 50. In one example, fuel pump 58 may be a one-way variable displacement pump. In some embodiments, the fuel pump may be further coupled to a pressure regulator 34 to enable pressure control. For example, the fuel pump may be configured to raise the pressure of fuel pumped from the fuel tank and a pressure regulator 34 may be sized to regulate the fuel rail pressure to 5 bar above tank pressure. In some embodiments, the fuel pump 58 may also be coupled to a check valve to ensure correct flow of fuel from the fuel tank into the fuel line.

Fuel may be delivered by fuel pump 58 into fuel line 50 via a tank shut-off valve 32 and a fuel rail shut-off valve 35 and a pressure regulator 34. The opening and shutting of tank shut-off valve 32 may control entry of fuel from fuel tank 20 into fuel supply line 50 while the opening and shutting of fuel rail shut-off valve 35 may control entry of fuel into fuel rail 52. In one example, one or more of tank shut-off valve and rail shut-off valve may be an on-off solenoid valve that is opened in response to a vehicle operator indicating that they wish to operate the engine with the gaseous fuel. A pressure regulator 34 is positioned downstream from fuel tank 20 and fuel rail 52 to regulate a fuel rail pressure (FRP) between the fuel rail and the injector 66 at a specified pressure above tank pressure, such as at 5 bar above tank pressure. If fuel rail pressure rises above the specified pressure, the regulator 34 allows communication back to the fuel tank through the fuel recovery line 51 in order to reduce the fuel rail pressure. If fuel rail pressure is below the specified pressure, the regulator 34 blocks communication with the fuel recovery line 51. As elaborated below, an additional by-pass return line 65 is provided with a pressure relief valve 56 (or bypass solenoid valve) that also selectively allows communication between the fuel rail and the fuel tank via the fuel recovery line 51. In one example, pressure regulator 34 may be an electronic pressure regulator including a mechanical pressure regulator 38, a fuel rail valve 36, and an electronic feedback component 40.

It will be appreciated that in some embodiments, rather than a pressure regulator and a bypass solenoid, an alternative approach may include a high pressure variable flow solenoid valve wherein the solenoid valve is adjusted to regulator pressure to a desired rail pressure after engine start-up and before engine shutdown.

Fuel rail valve 36 may be a duty-controlled solenoid valve. As such, since tank and rail shut-off valves are located on the higher pressure side of pressure regulator 34, the fuel rail and fuel tank shut-off solenoid valves may be referred to as high pressure solenoid valves, while the fuel rail valve 36 positioned downstream of the regulator, in recovery line 51, may be referred to as a low pressure solenoid valve. A filter 39 may also be positioned on the high pressure side of fuel supply line 50. Electronic feedback component 40 may receive input regarding the current fuel rail pressure from fuel rail pressure sensor 104, and accordingly adjust the duty cycle of fuel rail valve 36 to thereby adjust the valve's opening. Electronic feedback component 40 may also adjust the duty cycle of fuel rail valve 36 based on input regarding the current fuel rail temperature received from fuel rail temperature sensor 105.

In one example, fuel tank 20 may store the gaseous fuel in a pressure range of 10-700 bar (e.g., 0-100+ psi for LNG fuel, 500 psi for ANG fuel, 3000-6000 psi, or 250 bar, for CNG fuel, 1.80-25.5 bar for LPG fuel, and 5000-10,000 psi for hydrogen fuel) while pressure regulator 34 may regulate the fuel rail pressure to a fixed range of 10-40 bar (e.g., 2-10 bar for CNG fuel and 5 bar (as referenced with respect to the recovery line 51 and hence also the fuel tank pressure) for LPG fuel). Herein, the mechanical regulator may regulate the fuel line pressure to 5 bar while the duty-controlled solenoid valve may further regulate the pressure to between 5 and 10 bar. While the above example suggests regulating to 5 bar above tank pressure, in alternate embodiments, the pressure may be regulated to within 2-10 bar above tank pressure.

It will be appreciated that while the depicted embodiment shows pressure regulator 34 as an electronic regulator, in alternate embodiments, pressure regulation may be performed via only mechanical pressure regulator 38 wherein fuel rail valve 36 may be configured as a simpler on/off solenoid valve with no electronic feedback. However, by including electronic feedback input, pressure regulation may be achieved in the electronic regulator embodiment via the use of a smaller (e.g., relatively less accurate) mechanical regulator.

Fuel system 18 may further include a pressure relief valve (or solenoid) 56 in bypass line 65 for enabling pressure relief. Specifically, closed pressure relief valve 56 may be selectively opened in response to elevated fuel rail pressures to reduce the fuel rail pressure at fuel rail 52 to approximately a tank pressure value. As one example, where pressure regulator 34 is configured to regulate the pressure of the gaseous fuel to 5 bar, pressure relief valve 56 may be opened in response to a fuel rail over pressure condition. By venting fuel during elevated fuel rail pressures, component damage from prolonged exposure to elevated fuel rail pressures can be reduced. In addition, pressure relief valve 56 may enable the pressure regulator 34 to be bypassed so as to assist with fuel system priming. For example, pressure relief valve 56 may be opened at pressures below a specified venting pressure of the pressure regulator to enable increased fuel boiling during/after an engine shutdown to rapidly remove heat from the injectors and the fuel rail and better cool the fuel system. For example, after an engine shutdown, the pressure relief valve may be open (allowing communication from the fuel rail back to the fuel tank) to advantageously cool utilize the latent heat of vaporization of the fuel to cool the fuel rail, and then once the fuel is cooled below a threshold temperature, the pressure relief valve may be closed to build rail pressure to enable more fuel to be in a liquid state in the rail, even at elevated fuel temperatures. The opening the of pressure relief valve may further enable improved vapor purging during the engine start.

Gaseous fuels such as LPG may be affected by changes in pressure and temperature. For example, when stored or delivered in liquid form, the liquid fuel in the fuel line may vaporize under the influence of heat, pressure and temperature. The vaporization effect may also vary based on the composition of the LPG fuel. In a Liquid Phase Injection (LPi) system (as depicted in FIG. 1), the injected mass is metered as a liquid. Vapor in the fuel lines can significantly displace the liquid, and degrade engine restarts due to potentially incorrect fueling. As the vapor to liquid volume ratio of LPG is approximately 270:1, the vapor in the fuel line and rail must be purged prior to starting the engine to ensure an accurate injected fuel mass and hence start quality. To improve engine restart times and start quality, in response to a request for engine operation on gaseous fuel in liquid phase, the fuel pump and solenoid valves may be operated to prime the fuel rail. Herein, the fuel pump may increase the pressure in the fuel rail so that a liquid fuel may be sustained at the elevated fuel rail temperature.

In some engine systems, further improvements in restart times may be achieved by pre-priming the fuel rail. Therein, even before an engine operation request is received from the vehicle operator, and before the engine in cranked, the fuel pump is operated to prime the fuel rail. For example, with reference to the vehicle system of FIG. 1, vehicle system 6 may include one or more doors, including a driver door 90 via which the driver may enter a cabin of the vehicle. The driver door may be further coupled to a door sensor 92 to provide an indication regarding the status of the driver door ("driver door"). In response to the driver door being opened (or left ajar), a "driver door ajar" indication may be provided by door sensor 92 to the control system 14. In response to the received "driver door ajar" indication, the control system may selectively initiate fuel pump and solenoid operation so that by the time the driver is in the cabin and has requested engine operation, the fuel system is already primed with the gaseous fuel in liquid phase and the engine is ready to be cranked and restarted. Herein, in anticipation of an imminent engine restart request (based on the driver door being opened), the fuel pump is started to purge the fuel system of vapor and return it to the tank even before the vehicle operator has turned on an ignition key, or pressed an engine start button. As a result, the fuel rail may have sufficient liquid fuel by the time the operator requests the engine start. As an example, pre-priming operations may reduce engine restart times by 8 seconds.

While FIG. 1 shows a door sensor coupled to the driver door, it will be appreciated that alternate driver sensors may be used. For example, a driver sensor in or for a vehicle seat may be used. The sensor may be coupled to an active seat restraint system that determines whether a driver or occupant is present in the driver's seat. Alternatively, the sensor may be a seat sensor. Still other sensors may be used.

Irrespective of the nature of the driver sensor, the vehicle control system 14 may utilize the indication from the driver sensor to activate fuel priming (or pre-priming) to ensure that the engine is ready to start when the driver is in the car. This also helps to reduce indiscriminate priming that would otherwise unnecessarily increase vehicle electrical loads and drive the requirement for a larger battery and alternator.

The priming (or pre-priming) operations may be adjusted based on the estimated fuel composition (e.g., the ratio of propane to butane, etc.) so as to compensate for the vaporization effect of the fuel. Likewise, the priming operations may also be adjusted based on fuel rail and tank conditions and ambient conditions, such as an ambient temperature, humidity, or barometric pressure. In one example, appropriate temperature, pressure, and/or humidity sensors may be coupled to the vehicle system at a location in communication with ambient air (e.g., outside the vehicle, vehicle air intake system, etc.). As one example, vehicle system 6 is shown including a temperature sensor 94 for providing an estimate of an ambient temperature (T_amb) to control system 14.

Control system 14 is shown receiving information from a plurality of sensors 16 (various examples of which are described herein) and sending control signals to a plurality of actuators 81 (various examples of which are described herein). As one example, sensors 16 may include MAP and MAF sensors 124 and 125 in the intake, exhaust gas sensor 126, temperature sensor 127 located in the exhaust, ambient air temperature sensor 94, fuel tank and fuel rail temperature sensors 103 and 105 respectively, fuel tank and fuel rail pressure sensors 102 and 104 respectively, door sensor 92, fuel level sensor 57, etc. Other sensors such as pressure, temperature, fuel level, air/fuel ratio, and composition sensors may be coupled to various locations in the vehicle system 6. As another example, the actuators may include fuel pump 58, fuel injector 66, solenoid valves 32 and 36, pressure regulator 34, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 2-5.

The various components of the system of FIG. 1 enable a method for an engine operating on a gaseous fuel, wherein a fuel tank refill event is inferred based on a rate of change in fuel tank pressure, and in response to the refill event, an estimated fuel composition can be selectively updated. Then, during a subsequent engine restart, a fuel rail may be primed, wherein a priming duration is based on the updated composition.

Now turning to FIG. 2, an example routine 200 is shown for updating a fuel composition estimation in response to a fuel tank being refilled, and adjusting engine operations accordingly. By adjusting engine operations following an accurate fuel composition estimate, engine performance can be improved.

At 202, fuel tank conditions for a gaseous fuel of the engine system may be estimated and/or measured. In one example, the gaseous fuel used in the engine system is an LPG fuel. The estimated conditions may include, for example, fuel tank temperature (e.g., from a fuel tank temperature sensor), fuel tank pressure (e.g., from a fuel tank pressure sensor), fuel level (e.g., from a fuel level sensor), fuel tank air content (e.g., based on saturation vapor pressure data estimated from fuel tank temperature and fuel tank pressure values), etc. Additionally, at 202, ambient conditions may be estimated and/or measured. These may include, for example, ambient temperature, humidity, and barometric pressure.

At 204, it may be determined if a fuel tank refill event has occurred. As elaborated with reference to FIGS. 3A-B, a fuel tank refill event may be inferred based on changes (e.g., absolute change or rate of change) in a fuel tank pressure (as indicated by a fuel tank pressure sensor in FIG. 3B) and/or a change in fuel level (as indicated by a fuel level sender in FIG. 3A). A large change rate of change of fuel tank pressure may indicate a change in the saturation pressure of the fuel within the fuel tank, which may be due to a change in composition or temperature. Thus, a fuel composition estimate may be selectively updated before a subsequent engine restart to allow the fuel rail to be sufficiently primed prior to engine operation with the gaseous fuel in a liquid state. Thus, in one example, the refill event may trigger a selective updating of the estimated fuel composition. However, in another example, as elaborated herein, even if a tank-pressure based refill event has not occurred but a post engine restart fuel tank level based refill event has occurred, and if selected sampling conditions have been met, the fuel composition may be estimated and updated.

Upon confirmation of a fuel tank refill event, at 208, the routine includes selectively updating the estimated fuel composition prior to a subsequent engine restart. As elaborated with reference to FIG. 5, the selective updating includes updating the estimated fuel composition based on each of a fuel tank pressure, a fuel tank air content, and one of a fuel tank temperature and an ambient temperature. Specifically, the estimated fuel composition may be updated based on the lower of (that is, minimum of) the fuel tank temperature and the ambient temperature. By selecting the lower (or minimum) of the estimated temperatures, a more conservative fuel composition estimate may be computed based on which the fuel rail may then be primed. By priming the fuel rail based on the more conservative composition estimate, sufficient fuel rail priming may be ensured before a subsequent engine start. As such, the updating of the estimated fuel composition based on a tank refill event may occur while the engine is not operating with the gaseous fuel. For example, the updating may occur during engine shutdown conditions immediately preceding an engine restart. Alternatively, where the gaseous fuel (e.g., LPG) is a primary fuel, the updating may occur while the engine is operating with a secondary fuel (e.g., gasoline). In one example, the fuel composition is updated with the engine off only during a refill event indicated based on rate of change of tank pressure (FIG. 3B). In comparison, a typical composition update may need the fuel pump to be running (and therefore the engine to be running) to ensure fuel flow over the tank thermistor. As elaborated at FIG. 4, this may be used as one of the selective 'update conditions'.

Next, at 210, an engine restart may be confirmed. That is, it may be confirmed that the vehicle operator has indicated a desire to restart the engine from the shutdown condition and operate the engine with the gaseous fuel. Upon confirmation, at 212, the controller may prime the fuel rail during the (subsequent) engine restart based on the updated fuel composition. Priming the fuel rail during the engine restart includes priming the fuel rail for a duration before cranking the engine. Specifically, the fuel pump and solenoids may be operated for the determined duration before the engine is cranked and started so that the rail can be conditioned to support a liquid fuel at elevated fuel rail temperatures (elevated with respect to the fuel tank, which contains the fuel at saturation point).

Adjusting a calculated fuel saturation pressure at the fuel rail based on the updated composition, in order to prime the rail, may result, for example, in increasing the priming duration as a propane content of the LPG fuel increases (or propane to butane ratio increases) In still other examples, the priming duration may be adjusted based on an alternate fuel property that is affected by the fuel composition, such as a fuel density or fuel octane content. It will be appreciated that the priming feature may exit when the calculated saturation pressure at the rail (which is a function of the fuel composition and the fuel rail temperature) is at a level that will support a liquid phase fuel. Thus the priming duration may not be modeled directly, but may be based on the adjusted calculated fuel saturation pressure.

In some embodiments, the priming may include pre-priming. Therein, confirming an engine restart may include confirming that the driver door has been opened (e.g., via indication from a driver door sensor) and an engine start is imminent. In response to the driver door being opened and in anticipation of the imminent engine restart, the fuel rail may be primed based on the updated fuel composition estimate.

Next, at 214, one or more engine operations may be adjusted based on the updated fuel composition. For example, the controller may adjust a fuel injection amount and ignition timing during the engine restart based on the updated composition. As one example, the fuel injection amount may be increased as the propane content of LPG in the updated fuel composition increases due to change in density. As another example, the ignition timing may be advanced towards MBT as the propane content of LPG in the updated fuel composition increases.

Returning to 204, if the rate of change in tank pressure has not exceeded the threshold (FIG. 3B), this may indicate that the composition within the fuel tank has not changed significantly, and hence the composition is not updated at 206.

Next, at 218, an engine restart may be confirmed. That is, it may be confirmed that the vehicle operator has indicated a desire to restart the engine from the shutdown condition and operate the engine with the gaseous fuel. Upon confirmation, at 220, the controller may prime the fuel rail during the (subsequent) engine restart, based on the un-updated fuel composition. Herein, as the composition (or saturation vapor pressure properties of the fuel) may have not changed significantly (as determined at 204), the fuel rail prime operation can be performed using a non-updated composition estimation. In some embodiments, where priming includes pre-priming, in response to the driver door being opened and in anticipation of the imminent engine restart, the fuel rail may be pre-primed for the determined duration based on the un-updated fuel composition estimate. Then, at 222, one or more engine operations may be adjusted based on the un-updated fuel composition. For example, the controller may determine a fuel injection amount and ignition timing during the engine restart based on the retained un-updated composition.

From both 214 and 222, the routine may proceed to 223. Here, after the engine has been restarted and upon confirmation of a fuel tank refill event via a fuel tank level rising (FIG. 3A), it may be determined if selected fuel composition sampling conditions have been met (FIG. 4). That is, it may be determined if the fuel tank conditions will permit an accurate fuel composition estimation. As such, there may be fuel tank conditions that may impact the fuel composition estimation and lead to an erroneous fuel composition estimate. As elaborated with reference to FIG. 4, sampling conditions may be met if fuel tank temperatures and pressures are within a defined window and further based on a fuel tank air content. For example, if the fuel tank air content is higher than a threshold (as determined by the fuel tank temperature and fuel tank liquid level falling outside the window), the air in the fuel tank may impact the fuel composition estimate and a fuel composition update may not be allowed. In comparison, if the fuel tank air content is lower than the threshold (as determined by the fuel tank temperature and fuel tank liquid level falling within the window), the air in the fuel tank may not impact the fuel composition estimate and a fuel composition update may be allowed.

Thus, at 228, if the sampling conditions are met, a fuel composition may be updated based on the fuel tank conditions (including a fuel tank pressure, a fuel tank temperature, and a fuel tank air content), as further elaborated at FIG. 5. Then, at 229, during a subsequent prime request, a fuel rail priming operation may be performed based on the updated fuel composition estimate. Further, at 230, engine operations (e.g., fuel injection amount and ignition timing) may be adjusted based on the updated fuel composition estimate.

In this way, by allowing an estimated fuel composition to be updated following fuel tank refilling, and by enabling the updates to be performed only during fuel tank conditions that permit reliable fuel tank pressure and temperature data to be achieved, the fuel composition may be updated with higher accuracy and reliability. By adjusting a priming calculation and engine operations based on the updated composition, sufficient priming may be ensured and engine performance may be improved when operating with a gaseous fuel.

If the sampling conditions of 223 are not met, at 225, the fuel composition may not be updated. In addition, a composition status flag may be set to indicate that the composition estimation may be erroneous until it can be accurately updated. At 226, on subsequent restart attempts, the priming calculation may be based on the retained, un-updated composition, and may further compensate for the indication that the fuel composition has not been updated following the tank refill event. As an example, a correction factor or compensation factor may be used and the priming duration may be adjusted (e.g., increased). That is, after a fuel tank refill event, the duration of priming following a fuel composition update may be shorter than a duration of priming following no fuel composition update. By increasing the duration of priming in response to the indication that the fuel composition was not updated after a fuel tank was refilled, a more conservative priming operation may be performed. This reduces the likelihood of degraded engine performance resulting from insufficient priming.

Likewise, at 227, engine operation adjustments may be based on the retained, un-updated composition. As one example, the controller may use the correction factor to adjust the fuel rail priming, while maintaining a fuel injection and spark timing settings corresponding to the most recent or last non-updated fuel composition. As such, since the injection or spark timing may change based on the directional change in composition (e.g., based on whether the fuel went from low to high propane or low to high butane), using a fuel injection and spark setting corresponding to the most recent fuel composition estimate may be more reliable as a correction factor may not be able to be defined.

As such, the controller may continuously evaluate the sampling conditions (that is, the controller may continuously loop from 227 to 223) until the selected sampling conditions are met and the fuel composition is updated. For example, the controller may continuously evaluate the sampling conditions as long as the composition status flag is at the setting indicating that the composition estimation may be erroneous. Then, when the sampling conditions are met, the flag may be reset to indicate that the fuel composition has been accurately updated, and the routine may end.

Now turning to FIGS. 3A-B, routines 300 and 350 depict example methods for confirming a fuel tank refill event. As such, confirmation of a fuel tank refill event may trigger a subsequent fuel composition update. The fuel tank refill event may be inferred based on one or more tank conditions. In particular, the routine of FIG. 3A may be based on a fuel tank level and may be performed after an engine restart, while the routine of FIG. 3B may be based on a fuel tank pressure change and may be performed with the engine off.

Now turning to FIG. 3A, at 302, tank conditions for a gaseous fuel of the engine system may be estimated and/or measured after the engine has been restarted. In particular, the output from a fuel tank level sender may be determined. At 304, it may be determined is the fuel tank level (or rise in fuel level sender) is higher than a threshold. If yes, then at 306, the controller may infer a refill event based on the increase in the fuel tank level being higher than the threshold.

It will be appreciated that in the example of FIG. 3A, the tank level sender increase may not be registered until after the engine has been restarted. Thus, to enable a fuel tank refill event to be determined during engine-off conditions, a refill event based on a rate of change in tank pressure may be performed at FIG. 3B. The routine of FIG. 3B allow a refill event that occurs while the engine is off to be identified and a composition update to be accordingly triggered. As a result, a composition update may be performed prior to a subsequent engine restart and fuel rail priming operation.

Turning now to the routine of FIG. 3B, at 352, tank conditions for a gaseous fuel of the engine system may be estimated and/or measured over a duration while the engine is shutdown. These may include, for example, fuel tank temperature, fuel tank pressure, fuel level, fuel tank air content, etc. In one example, a controller may intermittently estimate the fuel tank conditions over a duration while the engine is shutdown.

At 354, a rate of change in the fuel tank pressure may be estimated or measured and it may be determined if the absolute rate of change is higher than a threshold rate. If yes, then at 306, the controller may infer a refill event based on the rate of change in the fuel tank pressure being higher than the threshold rate. As such, a rapid change in the fuel tank pressure may reflect a change in the fuel's saturation pressure which may be due to a change in composition and/or a change in fuel tank temperature. The controller may accordingly set a flag to indicate the fuel tank refill event.

If the (absolute) rate of change in the fuel tank pressure is not higher than the threshold rate, then the fuel saturation vapor pressure properties (and hence composition) may not have changed significantly. This may indicate that the retained, un-updated composition estimation is valid for the next subsequent restart and hence the fuel rail.

It will be appreciated that the indication of a tank refill event (that triggers a subsequent composition update) may have a different basis at different ambient conditions, vehicle tank fuel properties (composition & temperature) and the refueling station fuel properties (composition & temperature). For example, it is possible for two fuels with different compositions to have a similar saturation pressure due to a differing temperature. The inverse may also be true. That is, two fuels of the same composition but at different temperatures may have differing saturation pressures. As a result, it is possible for a refill event to not exceed the rate of change of tank pressure threshold and be identified via an increase in fuel level.

Following confirmation of a fuel tank refill event post an engine restart (FIG. 3A), a fuel composition may be updated (FIG. 5) once the required sampling conditions for updating fuel composition have been met (223, FIG. 4).

Now turning to FIG. 4, an example routine 400 is shown for confirming that selected sampling conditions are present for enabling a fuel composition update to be performed. Specifically, routine 400 verifies that the fuel tank conditions are within defined windows wherein the fuel within the tank is under stable saturation pressure conditions, the fuel tank temperature and pressure data are reliable and may not be impacted, or corrupted, by fuel tank air data or external inputs (e.g., underbody temperature input corrupting sensor data). As such, the presence of residual air in a fuel tank may affect the composition estimation. Therefore, during routine maintenance operations, the fuel tank should be purged. However, during some conditions, such as when the fuel tank is not sufficiently purged during a service event, the amount of air in the fuel tank may be high, leading to a fuel tank air partial pressure exceeding the saturation pressure of the LPG fuel. In such situations, the fuel tank pressure may be elevated, leading to an inaccurate LPG composition estimate. In particular, a propane percentage of the fuel composition may be overstated. In other words, the presence of residual fuel tank air may raise the fuel tank pressure from an actual level corresponding to the actual fuel level and actual propane content to a higher level corresponding to a higher level of fuel and a higher propane content. Thus, by better identifying and compensating for errors arising due to the presence of residual air in the fuel tank, a fuel composition estimate may be more accurately or selectively updated. Likewise, unstable and/or insufficient soak conditions for the various sensors used in estimating fuel tank data can also lead to inaccurate composition estimations. Thus, by verifying that sensor soak conditions and composition sampling conditions have been met, the reliability of the fuel tank data can be improved, and the accuracy of the fuel composition estimated using that data can also be improved.

At 406, the routine includes determining if the fuel tank air content is higher than a threshold. In one example, the fuel tank air content may be inferred by comparing the fuel tank level sender and the fuel tank temperature. In the case of LPG, assuming a worst case/lowest saturation pressure fuel, at a given temperature the saturation pressure can be estimated. Likewise, assuming the quantity and conditions under which the air is introduced into the tank (i.e. during a service/maintenance procedure), at a given tank liquid level, the partial pressure of the air can be estimated. For example, if the fuel tank temperature is less than 10° C., and the fuel tank liquid levels is greater than ~75% (of tank water capacity), it may be determined that the resultant tank air partial pressure can impact the fuel composition estimate, leading to an inaccurate estimate. Thus, if the fuel tank air content is higher than the threshold, as determined by each of the fuel tank temperature and fuel level data, then at 408, it may be determined that the residual air content of the fuel tank may corrupt the fuel tank data and impact the fuel composition estimate. Accordingly, at 410, the fuel composition estimate is not updated and the previous un-updated composition is retained.

If the fuel tank air content is less than the threshold, then at 412, the controller may determine that the residual air in the fuel tank may not corrupt the fuel tank sensor readings, and may not impact a fuel composition update. The routine may then proceed to 414 where the sampling conditions are evaluated before updating the fuel composition based on fuel tank conditions. In other words, fuel composition updating may be selectively enabled.

If the tank air content is determined to be in a range that may not impact the composition calculation, the sampling conditions for a 'cold' composition update conditions may be confirmed at 414, irrespective of whether a tank refill has been detected. These may include confirming that an engine-off soak time was higher than a threshold duration, ensuring that the tank conditions and sensors are stable, and that the fuel pump is running to ensure fuel flow over the thermistor. As such, these conditions may correspond to the stable or accurate tank conditions for updating the fuel composition during cold engine and underbody conditions. Specifically, these conditions may confirm that no heat has been input to the thermistor from the underbody and that fuel tank vapor and liquid temperatures are substantially equal. One noise factor that is managed with a 'cold' update is the external inputs, such as the underbody heat input into the tank thermistor, which will affect the composition estimation. For example if the tank thermistor reading is 5° C. higher than the actual bulk fuel temperature, the composition calculation may incorrectly calculate to have 12% lower propane content. As such, these numbers will vary based on the starting fuel temperature and composition. As used herein, the thermistor may refer to a fuel tank thermistor mounted on the tank (or in the fuel supply line) in the fuel flow path directly downstream of the fuel pump.

If 'cold' composition conditions are confirmed at 414, then the routine proceeds to 422 to enable a fuel composition update. If the cold composition conditions are not confirmed, then the composition estimated is not updated but retains the previous un-updated fuel composition estimate.

If the sampling conditions for a 'cold' composition update have not been met, then at 415, the refill event indication may be determined. At 416, it may be determined if the refill is in response to an increase in the fuel level. If yes, additional sampling conditions may need to be confirmed. For example, a fuel tank refill indicated in response to an increase in the fuel level may have occurred during warm or hot engine conditions where the 'cold' composition criteria have not been satisfied. As a result the 'warm' or 'hot' composition update conditions may need to be confirmed to confirm reliability of the fuel tank data used to update the composition.

At 418, "warm" composition update conditions may be confirmed. These may include confirming that the fuel tank temperature relative to the ambient and engine temperature is lower than a threshold, and that the fuel pump is running to ensure fuel flow over the thermistor. As such, these conditions may correspond to stable or accurate tank conditions for updating the fuel composition during warm conditions. Specifically, these conditions may confirm that minimum heat has been input to the thermistor from the underbody, and that the engine is not having a hot restart. That is, the engine was only operated, for a brief period prior to refilling, and then restarted. If warm composition conditions are confirmed, then the routine proceeds to 422 to enable a fuel composition update.

If the warm conditions are not confirmed, then at 420, the routine proceeds to confirm hot composition conditions. These may include confirming specified drive cycle conditions are met (e.g., the vehicle being above a defined vehicle speed for a threshold duration), exhaust gas rear EGO sensor temperature is below a threshold, and the fuel pump is running to ensure fuel flow over the thermistor. As such, these conditions may correspond to the stable or accurate tank conditions for updating the fuel composition during hot conditions. Specifically, these conditions may confirm that there is reduced heat input from the exhaust to the thermistor, that the underbody temperature is not excessive, and that there is sufficient air flow to reduce the underbody temperature input into the tank. If hot composition conditions are confirmed, then the routine proceeds to 422 to enable a fuel composition update. Hot composition conditions may be continuously monitored, however, if they are not confirmed, then the routine proceeds to 410 and does not update the estimated fuel composition. Instead, the previous un-updated fuel composition estimate is retained and the composition status flag is set to indicate that the composition has not been updated and may be erroneous. In this way, the 'cold,' 'warm' and 'hot' composition updates are evaluated in order to ensure that the most accurate composition update available is always employed, where a 'cold' update has the highest composition estimation accuracy.

In this way, when the fuel tank air content is less than a threshold and each of the fuel tank pressure and fuel tank temperature are within a window, the estimated fuel composition may be updated. However, when the fuel tank air content is higher than the threshold, the estimated fuel composition may not be updated. In other words, the fuel composition is selectively updated based on the fuel tank conditions.

Now turning to FIG. 5, an example routine 500 is shown for selectively updating an estimated fuel composition based on the fuel tank pressure and fuel tank temperature.

At 502, the routine includes confirming that there is no degradation of any of the primary sensors (that is, the fuel tank pressure and temperature sensors). In one example, diagnostic routines may be intermittently or continuously performed (e.g., once every drive cycle, etc.) to verify that the primary sensors are functional. If degradation of a primary sensor is determined, then at 504, primary sensor degradation may be indicated by setting a diagnostic code. Further, a default or un-updated fuel composition estimate may be used and applied. For example, the default fuel estimate may be blended in using a rolling average. Herein, when it is known that the primary sensors are not reliable, the composition is not updated.

If the primary sensors are not degraded, then at 506 it may be confirmed that there is no degradation of the fuel level sensor. As such, a fuel level indication may be used alongside other fuel tank conditions (e.g., fuel tank temperature) to infer an air content in the fuel tank, which in turn can have an impact on fuel composition estimations. If a fuel level sensor degradation is determined, then at 508, the fuel level sensor degradation is indicated by setting a diagnostic code. The controller may then estimate a fuel composition while applying an upper clip. The updated fuel estimate may then be blended in using a rolling average. Herein, by applying the upper clip, the potential impact of the unknown air content of the tank can be reduced. In one example, the upper composition clip is based on a typical mid to high range propane content fuel expected in the field. For example, a typical mid to high range fuel may be 85% propane. As it cannot be determined if the tank air content may impact the composition calculation, which may overstate the propane content, the composition is allowed to update normally up to the clip, hence limiting the impact of the tank air content.

If the fuel level sensor is not degraded, then at 510, the controller may update the fuel composition based on the fuel tank pressure and the fuel tank temperature. The updated estimate may be blended in using a rolling average.

As previously elaborated, the controller may then adjust a priming duration on a subsequent engine restart based on the updated composition. For example, the fuel rail may be primed for a first, shorter priming duration when the estimated fuel composition is updated, and primed for a second, longer priming duration when the estimated fuel composition is not updated (that is, with an additional correction factor added). The first duration may be based on the updated fuel composition, while the second duration may be based on the non-updated fuel composition and a degree to which to the fuel tank pressure and temperature are outside the window. For example, as a difference between the fuel tank pressure or temperature and the limits of the sampling window increase, the second duration may be increased.

In one example, a composition status flag may be used, where 1 indicates an updated composition, 0 indicates the composition has not been updated since the last refill and −1 indicates the composition is unknown or a default value has been used. With a composition status of 1, a normal prime may be the action, if the status is 0 a short additional time period may be added to each subsequent prime event and if the status is −1, more substantial time period may be added to each subsequent prime event.

In one example, during a first tank refill event, when a fuel tank air content is less than a threshold, an estimated fuel composition may be updated. In comparison, during a second tank refill event when the fuel tank air content is higher than the threshold, the estimated fuel composition may not be updated. That is, an un-updated, most recent fuel composition estimate may continue to be used. Each of the first and second tank refill event may be inferred based on a rate of change in fuel tank pressure being higher than a threshold during engine-off conditions, and/or based on a change in fuel level in the fuel tank.

During a first engine restart following the first tank refill event, a controller may prime the fuel rail for a first duration based on the updated composition. That is, the fuel pump and solenoids may be operated for the first duration in order to prime the fuel rail so that a liquid fuel may be sustained at the elevated fuel rail temperature. In comparison, during a second engine restart following the second tank refill event, the fuel rail may be primed for a second duration based on the non-updated fuel composition (e.g., composition status flag of 0). Herein, the second duration may be longer than the first duration. For example, during the second tank fill refill event, the controller may set a diagnostic code or composition status flag to indicate that the fuel composition has not been updated. Consequently, during the second engine restart, the controller may increase the (second) duration over which the fuel pump is operated and the fuel line is primed in response to the indication. The (second) duration may be increased with a factor based on the fuel tank fuel level (or pressure) and temperature. For example, the controller may determine a duration based on the un-updated fuel composition update (such as the one used during a preceding priming operation) and then increase the duration with a factor (e.g., correction factor or compensation factor) that is based on a current estimate of fuel tank temperature and pressure.

An example adjustment of a priming operation during an engine start based on a fuel composition estimate (updated or un-updated) is shown at FIG. 6. Map 600 compares a priming operation before an engine restart in response to an indication of an updated fuel composition estimate (dashed lines) to a priming operation before an engine restart in response to an indication of an un-updated fuel composition estimate (solid lines). In particular, map 600 shows an indication regarding an engine on or off status at graphs 602 and 603, an indication regarding a refill status (or refill detected flag) at graph 604, an indication regarding fuel a fuel tank air content at graphs 606 and 607, changes in a composition update flag at graphs 608 and 609, an indication regarding an engine restart or ignition request at graph 610, and an indication regarding a fuel pump operation at graphs 612 and 613.

In the depicted example, the engine may be shutdown at t1 (graph 602). While the engine is shutdown, fuel tank conditions may be monitored to determine if a fuel tank refill event has occurred. For example, tank pressure and temperature conditions may be monitored. At t2, a refill may be detected based on a rate of change in tank pressure being higher than a threshold. Accordingly, at t2, a refill detected status flag may be set (graph 604). As such, while the engine is shutdown, a fuel tank air content may also be inferred based on the fuel tank temperature and pressure conditions. As a first example, at t2, it may be inferred that the fuel tank air content (graph 607, dashed line) is lower than a threshold 605. In response to the fuel tank air content being lower than the threshold 605, it may be determined that the fuel tank air content may not have an impact on a fuel composition estimate that is based on fuel tank pressure and temperature. That is, the fuel tank air content may not corrupt the composition estimate. Therefore, in response to the refill event being detected, and due to the fuel tank air content being lower than the threshold, at t2, a fuel composition update is performed and a fuel composition update flag is set (graph 609, dashed line).

At 610, an ignition may be turned on and an engine restart request may be received. In response to the engine restart request, a fuel rail priming operation may be initiated at t4 wherein the fuel pump is run. Herein, the priming operation may be based on the recently updated fuel composition. For example, a duration d1 of pump operation for priming the fuel rail may be based on the updated fuel composition estimate. Following fuel rail priming, at t5, the engine may be restarted.

In an alternate example, at t2, it may be inferred that the fuel tank air content (graph 606, solid line) is higher than the threshold 605. In response to the fuel tank air content being higher than the threshold 605, it may be determined that the fuel tank air content may have an impact on a fuel composition estimate that is based on fuel tank pressure and temperature. That is, the fuel tank air content may corrupt the composition estimate. Therefore, even though a refill event has been detected (graph 604), due to the fuel tank air content being higher than the threshold, at t2, a fuel composition update is not performed and a fuel composition update flag is not set (graph 608, solid line). In contrast, a flag may be set to indicate that the fuel composition has not been updated and the most recent fuel composition update available may not correspond to the actual fuel composition of fuel in the fuel tank. In addition, a correction factor may be determined.

At 610, an ignition may be turned on and an engine restart request may be received. In response to the engine restart request, a fuel rail priming operation may be initiated at t4 wherein the fuel pump is run. Herein, the priming operation may be based on the most recent un-updated fuel composition and further based on the correction factor. For example, a duration d2 of pump operation for priming the fuel rail may be based on the un-updated fuel composition estimate (e.g., the last updated composition estimate) and with a compensation added on that is based on the correction factor. Consequently, the duration d2 of priming in response to an un-updated fuel composition estimate is longer than the duration d1 of priming in response to the updated fuel composition estimate. Then, following the longer fuel rail priming, at t6, the engine may be restarted. That is, fuel pump operation may be extended to ensure sufficient fuel rail priming, and an engine restart may be delayed.

In this way, a fuel composition estimate may be updated following a fuel tank refill event in anticipation of a change in composition triggered by the refueling. Further, the fuel composition update may be enabled only if selected fuel tank conditions are met wherein the fuel tank data is reliable. The updated composition based on the reliable tank data may then be used to determine a fuel rail priming duration on a subsequent engine restart. By enabling the composition update to be performed only upon confirming the reliability of the data, a more accurate fuel composition may be estimated during engine shutdown conditions. By adjusting the priming duration on the subsequent engine restart based on the updated composition estimate, sufficient priming may be achieved, improving engine startability with gaseous fuels. Overall, engine performance may be improved, and engine stalls due to insufficient fuel rail priming may be reduced.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   inferring a refill event based on a rate of change in fuel tank pressure;
   in response to the refill event,
   selectively updating an estimated fuel composition; and
   priming a fuel rail during a subsequent engine restart, a priming duration based on the updated composition; and
   supplying gaseous fuel from the primed fuel rail to the engine to operate the engine on the gaseous fuel.

2. The method of claim 1, wherein the inferring includes, inferring the refill event if an absolute rate of change in fuel tank pressure is higher than a threshold rate.

3. The method of claim 1, wherein the selectively updating includes, estimating the fuel composition based on a fuel tank pressure, a fuel tank air content, and one of a fuel tank temperature and an ambient temperature.

4. The method of claim 3, wherein the selectively updating based on one of the fuel tank temperature and the ambient temperature includes updating based on the fuel tank temperature when the fuel tank temperature is lower than the ambient temperature, and updating based on the ambient temperature when the ambient temperature is lower than the fuel tank temperature.

5. The method of claim 1, wherein supplying gaseous fuel further includes adjusting one or more of a fuel injection amount, fuel injection timing and ignition spark timing during engine operation based on the updated composition.

6. The method of claim 1, wherein the gaseous fuel includes a fuel that is in gaseous form at atmospheric conditions.

7. The method of claim 6, wherein determining the priming duration based on the updated composition includes increasing the priming duration as a propane content of the fuel increases.

8. The method of claim 1, wherein the updating is performed during engine shutdown conditions immediately preceding the engine restart.

9. The method of claim 1, wherein the gaseous fuel is LPG and wherein priming the fuel rail during the restart includes priming the fuel rail before cranking the engine.

10. A method for an engine, comprising:
    during a first tank refill event when a fuel tank air content is less than a threshold, updating an estimated gaseous fuel composition;
    during a second tank refill event when the fuel tank air content is higher than the threshold, not updating the estimated gaseous fuel composition; and
    adjusting operation of the engine operating on gaseous fuel based on the estimated gaseous fuel composition.

11. The method of claim 10, wherein the first and second tank refill events are inferred based on an absolute rate of change in fuel tank pressure being higher than a threshold during engine-off conditions.

12. The method of claim 10, further comprising,
    during a first engine restart following the first tank refill event, priming a fuel rail for a first duration based on the updated composition; and
    during a second engine restart following the second tank refill event, priming the fuel rail for a second duration based on the non-updated fuel composition.

13. The method of claim 12, wherein the second duration is longer than the first duration.

14. The method of claim 12, further comprising, during the second tank refill event, setting a diagnostic code to indicate that the fuel composition has not been updated, and during the second engine restart, increasing the second duration in response to an indication of degradation, the second duration increased with a correction factor.

15. A method for an engine operating on a gaseous fuel, comprising:
    inferring a refill event based on an increase in a tank fuel level; and
    in response to the refill event,
    selectively updating an estimated fuel composition based on each of a fuel tank pressure, a fuel tank air content and a lower of a fuel tank temperature and an ambient temperature;
    priming a fuel rail during a subsequent engine restart, a priming duration adjusted based on the selective updating; and
    delivering gaseous fuel from the primed fuel rail to engine cylinders to start the engine.

16. The method of claim 15, wherein the selectively updating includes, when the fuel tank air content is less than a threshold and each of the fuel tank pressure and fuel tank temperature are within a window, updating the estimated fuel composition; and when the fuel tank air content is higher than the threshold and each of the fuel tank pressure and/or fuel tank temperature is outside of the window, not updating the estimated fuel composition.

17. The method of claim 16, wherein adjusting the priming duration includes using a first, shorter priming duration when the estimated fuel composition is updated, and using a second, longer priming duration when the estimated fuel composition is not updated.

18. The method of claim 17, wherein the first duration is based on the updated fuel composition, and wherein the second duration is based on the non-updated fuel composition.

19. The method of claim 16, further comprising, setting a diagnostic code in response to the estimated composition not being updated.

20. The method of claim 15, wherein each of the refill event and the selective updating is performed during engine operation or shutdown conditions.

* * * * *